Figure 1:
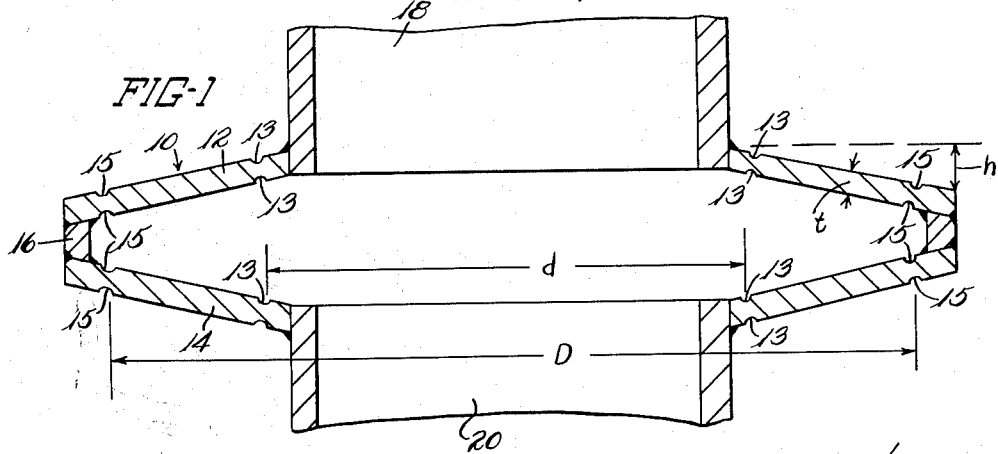

Jan. 8, 1963     E. T. ARMSTRONG     3,072,422

FLEXIBLE COUPLING FOR TUBULAR MEMBERS

Filed Jan. 6, 1960

INVENTOR.
EDWARD T. ARMSTRONG
BY
Oldham & Oldham
ATTYSce # United States Patent Office 3,072,422
Patented Jan. 8, 1963

3,072,422
FLEXIBLE COUPLING FOR TUBULAR MEMBERS
Edward T. Armstrong, 490 Pepperidge Tree Terrace,
Smoke Rise, Butler, N.J.
Filed Jan. 6, 1960, Ser. No. 886
5 Claims. (Cl. 285—229)

This invention relates to flexible couplings for tubular members, and, more particularly, is concerned with flexible couplings for steam pipes and the like, for example, those used on board ships.

It has been the usual practice, heretofore, to provide U-shaped bends in steam pipes to allow for expansion and contraction of the pipes and to reduce the transmission of noise and vibration. However, such bends are heavy and wasteful of material, are space-consuming, are subject to failure in fatigue when repeatedly stressed, and do not adequately cushion transmission of noise and vibrations.

It has likewise been proposed heretofore to provide flexible couplings for tubular members in which yieldable diaphragms are employed, but such diaphragms do not normally possess the necessary strength requirements to adequately resist internal pressures, particularly with high temperature and high pressure steam, and usually require additional supporting means strengthening and supporting the flexible couplings. Moreover, diaphragm type couplings possess substantially no inherent resiliency, which is often desirable.

It is the general object of the present invention to avoid and overcome the foregoing and difficulties of and objections to prior art practices by the provision of an improved flexible coupling for tubular members allowing lengthwise movement of the members while resiliently opposing such movement, the flexible coupling being characterized by inexpensiveness of construction, comparatively small size, high strength, and excellent fatigue resistance.

Another object of the invention is to provide a flexible coupling for tubular members and utilizing a pair of springs of the dished washer type positioned concave side to concave side with the outer peripheries of the springs being secured together in fluid tight relation and a tubular member secured to the inside periphery of each spring in fluid tight fashion.

Another object of the invention is the provision of a fluid tight coupling of the character set forth in which the cone height of each spring has a ratio within certain limits with the thickness of the spring, and the outside diameter of the spring has a ratio within certain limits to the inside diameter of the spring.

Another object of the invention is to provide a flexible coupling using at least one concave washer type spring having the characteristic during part of its movement of continued deflection under substantially the same load.

The foregoing objects of the invention, and other objects which will become apparent as the description proceeds, are achieved by the combination in a flexible coupling for connecting tubular members of a pair of springs of the dished washer type positioned concave side to concave side, means joining the outer peripheries of the springs together in fluid tight relation, a pair of tubular members having a diameter substantially equal to the inside diameter of the springs, means joining a tubular member to the inside periphery of one spring in fluid type relation therewith, and means joining the other tubular member to the inside periphery of the other spring in fluid tight relation therewith. Usually each spring possesses the characteristic of continued deflection with substantially no increase in load over a considerable portion of its springing movement. It can also be said that each spring may have a ratio of cone height divided by spring thickness of between about 1 and about 2, and a ratio of spring outside diameter divided by spring inside diameter, of between 1 and about 3. Preferably the springs are notched near their inner and outer peripheries to form elastic hinges and facilitate the large deflection of the coupling.

Figure 2:
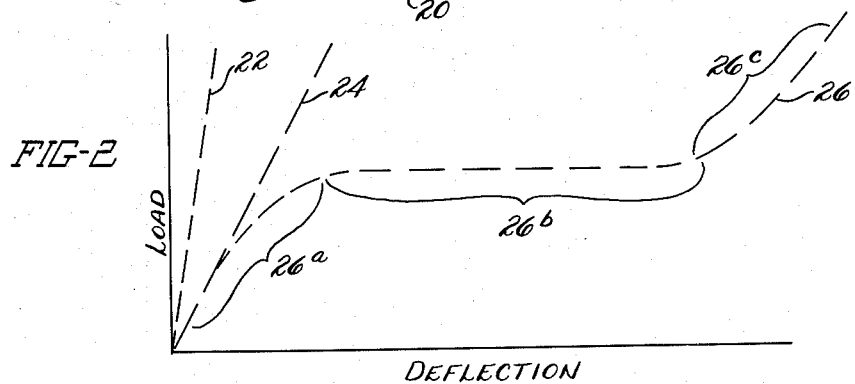

For a better understanding of the invention reference should be had to the accompanying drawings wherein FIG. 1 is a diagrammatic cross-sectional view of a typical flexible coupling incorporating the principles of the invention;

FIG. 2 are curves representing load plotted against deflection of typical springs including those utilized in the flexible coupling of the invention.

Figure 3:
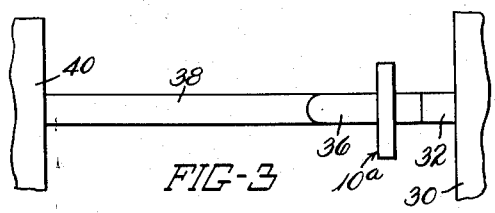
Figure 5:
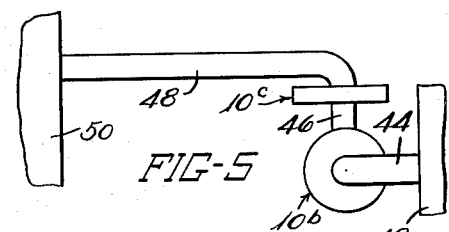
Figure 4:
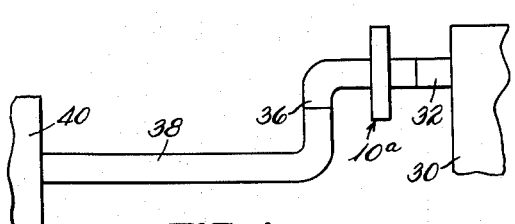
Figure 6:
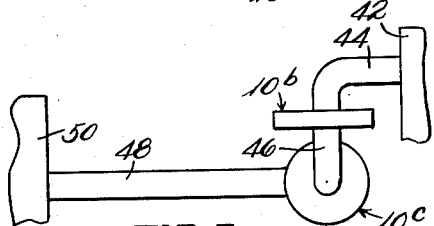

FIGS. 3 and 4 are plan and side elevation views of a coupling installation in accord with the invention; and FIGS. 5 and 6 are views similar to FIGS. 3 and 4 but showing another installation.

In the drawings, the numeral 10 indicates generally a flexible coupling comprising a pair 12 and 14 of springs of the dished washer type, sometimes called Belleville springs, having their concave sides positioned towards each other in the manner illustrated. The outer peripheries of the springs 12 and 14 are joined together in fluid tight relation in any desired or preferred manner. One typical way of achieving this result is to provide an appropriately beveled metal ring 16 which is welded, usually both inside and out, to the outer peripheries of the springs 12 and 14.

The springs 12 and 14 are preferably formed with fully circular grooves or notches at 13 parallel to and adjacent their inner peripheries on both the inner and outer surfaces, and at 15 parallel to and adjacent their outer peripheries on both the inner and outer surfaces. These notches form elastic hinges at the edges of the springs 12 and 14 to facilitate the large deflection of the coupling. The notches 13 and 15 act to decrease the effective length of the springs 12 and 14 so that for practical purposes the inside diameter of each spring is measured by distance "$d$" and the outside diameter by distance "$D$." In the operation of the coupling of the invention with the notches 13 and 15 acting as elastic hinges and with the tube ends moving towards each other the conical springs bow or curve outwardly in the areas between the notches, the bow becoming greater as the tube ends move closer together. In this manner the flexibility of the joint is provided.

A tubular member 18 having an outside diameter substantially equal to the inside diameter of the spring 12 is suitably secured in fluid tight relation with the inside periphery of the spring 12 in any suitable or desired manner. In the form of the invention illustrated this is achieved by welding the tubular member 18 to the inner periphery of the spring 12. In like fashion, a tubular member 20 is suitably secured in fluid tight relation to the inner periphery of the spring 14.

It has been found that the strength and efficiency of the flexible coupling, and particularly the fatigue life thereof is notably improved if the cone height $h$ of each spring 12 and 14 bears a ratio within certain limits to the thickness $t$ of each spring. More specifically, each spring 12 and 14 has a ratio of cone height $h$ divided by spring thickness $t$ of between about 1 and about 2, and usually in the neighborhood of about 1.5. The drawings for purposes of illustration of somewhat exaggerate the distance $h$ in relation to thickness $t$. It is also important that the outside diameter D of each spring 12 and 14 have a certain ratio, or a reasonable range of ratios with the inside diameter $d$ of each spring. More specifically, the ratio of spring outside diameter D divided by spring inside diameter $d$ should be between about 1 and about 3, and usually in the neighborhood of about 2.

Now referring to FIG. 2, and illustrating typical spring curves plotting load as the ordinate and deflection as the abscissa, a typical stiff spring of the coiled or cantilever type will produce a linear curve indicated by the line 22. A typical spring of somewhat less stiffness will have a linear curve such as represented by the line 24.

It has been found desirable to utilize dished washer springs in the present invention, in the manner described, and these springs possess the characteristic that they can be constructed to have great versatility of load-deflection characteristics. In such members, the slope of the load-deflection curve may be constant, that is linear, or it may be non-linear, i.e. continually decreasing, zero, continually increasing, or a combination of these. It has been found preferable in order to obtain particularly beneficial results in the present invention to utilize a spring of the dished washer type having load-deflection characteristics of the type shown by the curve 26 in FIG. 2, namely, of a type having deflection constantly increasing in a non-linear fashion as load is increased, this being shown by the area 26a of the curve, with the curve then flattening out substantially level for a considerable portion marked 26b in which deflection is considerable with no increase in load, and with the curve then rising rather sharply in a section 26c wherein deflection is less than linear from increase in load. Thus, the coupling functions even under high heat conditions and expansion without imparting back into the piping system heavy loads such as would be created by linear spring deflection.

A flexible coupling constructed from good steel in accord with the teaching of the present invention achieves the objects of the invention in that fatigue life approaches the infinite, strength is relatively high, and size requirements are kept to a minimum. Flexible couplings in accord with the invention have been found to reduce noise and vibration transmissions through the tubular members connected, allow relatively high expansion and contraction movement of the tubular members under alternating times or cycles of high and low temperature conditions while possessing adequate strength for extremely high fluid pressure conditions in the couplings.

FIGS. 3 and 4 illustrate the application of the couplings of the invention to a particular installation wherein axial flexibility and machinery reactions are important. A steam operated machine 30 is supplied with steam by a conduit 32 connected through a coupling 10a to a gooseneck 36 extending by way of piping 38 to a boiler 40.

FIGS. 5 and 6 show an installation concerned with shear reactions at piping-machinery connections. More particularly a steam operated machine 42 is connected by conduit 44 to a coupling 10b and through an elbow 46 to a coupling 10c, through an elbow to piping 48 extending to a boiler 50.

The coupling installations provide axial and torsional flexibility, and among other advantages allow machinery-piping connections in equilibrium with only shear reactions.

While in accord with the patent statutes one best known embodiment of the invention has been illustrated and described in detail, it is to be particularly understood that the invention is not to be limited thereto or thereby, but that its scope is defined in the appended claims.

What is claimed is:

1. The combination in a flexible fluid-tight coupling for connecting tubular members of a pair of endless, impervious, full circle conical springs of the dished washer type positioned concave side to concave side, each spring having a notch extending as a complete circle parallel to and adjacent to its inner periphery, each spring having a notch extending as a complete circle parallel to and adjacent to its outer periphery, the notches reducing the wall thickness of the springs whereby the reduced wall thickness areas act as elastic hinges, means rigidly joining the outer peripheries of the springs together in fluid-tight relation so that any hinging of the springs adjacent thereto is substantially confined to the notches adjacent the outer peripheries thereof, means rigidly joining the inner periphery of each spring to a tube in fluid-tight relation so that any hinging of the spring adjacent thereto is substantially confined to the notches adjacent the inner periphery of each spring, said coupling being assembled substantially at room temperature so that when employed to transmit hot fluids the coupling flexes in the direction allowing the tube ends to move closer together at which time the conical springs bow between the inner and outer notches therein with the notches acting as hinges.

2. The combination defined in claim 1 wherein each conical spring has a ratio of cone height divided by spring thickness of between about 1 and about 2, and a ratio of spring outside diameter divided by spring inside diameter of between about 1 and about 3.

3. The combination defined in claim 1 wherein each conical spring has a ratio of cone height divided by spring thickness of about 1.5, and a ratio of spring outside diameter divided by spring inside diameter of about 2.

4. The combination defined in claim 1 wherein each conical spring upon application of a load thereto in a direction moving the tube ends towards each other has a load deflection curve starting from zero deflection which is first greater than linear, which then flattens out for a considerable portion to indicate an area of considerable deflection with substantially no increase in load, and then which rises sharply in a manner less than linear.

5. The combination defined in claim 1 wherein each conical spring upon application of a load thereto in a direction moving the tube ends towards each other has a load deflection curve starting from zero deflection which is first greater than linear, which then flattens out for a considerable portion to indicate an area of considerable deflection with substantially no increase in load, and then which rises sharply in a manner less than linear and wherein each conical spring has a ratio of cone height divided by spring thickness of between about 1 and about 2, and a ratio of spring outside diameter divided by spring inside diameter of between about 1 and about 3.

References Cited in the file of this patent

UNITED STATES PATENTS

| | | |
|---|---|---|
| 729,926 | Fulton | June 2, 1903 |
| 1,095,100 | Fulton | Apr. 28, 1914 |
| 1,197,496 | Jobling | Sept. 5, 1916 |
| 1,523,951 | Fulton | Jan. 20, 1925 |
| 1,902,323 | Monge | Mar. 21, 1933 |

FOREIGN PATENTS

| | | |
|---|---|---|
| 539,041 | Germany | Oct. 26, 1930 |
| 100,253 | Sweden | Dec. 12, 1940 |